Aug. 25, 1925.

M. A. MARQUETTE

TIRE BUILDING

Filed July 8, 1922     2 Sheets-Sheet 1

1,551,040

INVENTOR
Melvon A Marquette
BY
Edward C Taylor
ATTORNEY

Aug. 25, 1925.
M. A. MARQUETTE
1,551,040
TIRE BUILDING
Filed July 8, 1922    2 Sheets-Sheet 2
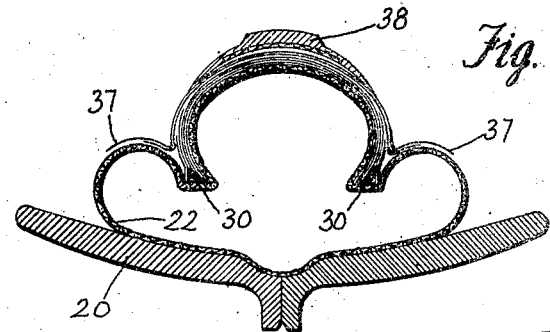
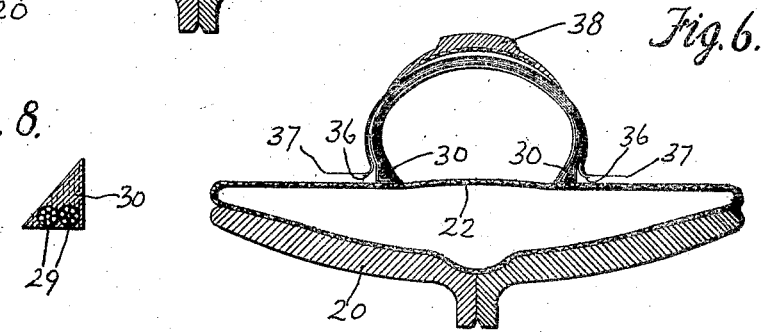
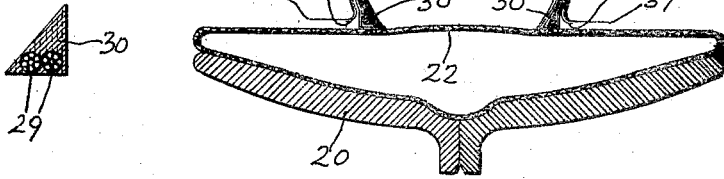
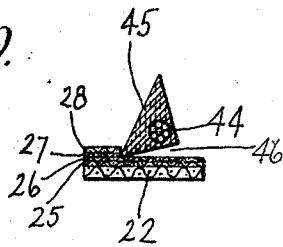
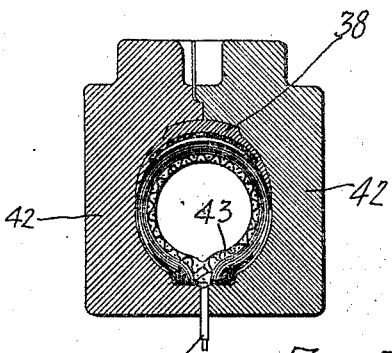
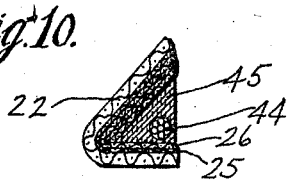
INVENTOR
Melvon A. Marquette
BY
ATTORNEY Patented Aug. 25, 1925.

1,551,040

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TIRE BUILDING.

Application filed July 8, 1922. Serial No. 573,665.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in Tire Building, of which the following is a specification.

My invention relates to a method of and apparatus for constructing laminated rubber articles such as the outer casings of pneumatic tires, and has for its object the improvement of prior methods and apparatus from standpoints of economy, accuracy and rapidity.

The invention will now be described with particular reference to the accompanying drawings, in which—

Figs. 2 to 6 are sectional views corresponding to a portion of Fig. 1 and illustrating successive stages in the building of the casing;

Fig. 7 is a sectional view showing the manner of compacting the casing during vulcanization;

Fig. 8 is a sectional view of one form of bead filler;

Figs. 9 and 10 are fragmentary views corresponding to Figs. 1 and 3 illustrating the action of a modified form of bead filler.

Figure 11:
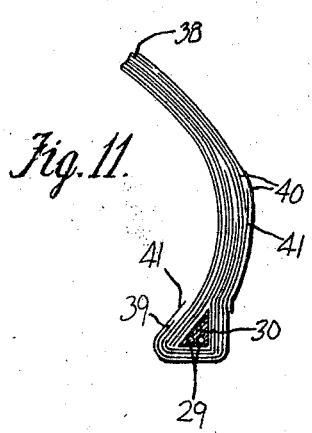
Fig. 11 is a section on a larger scale of the bead portion of the completed tire casing.

In constructing a tire casing according to my invention I employ a rim or support 20 having a concave outer face 21 serving as a support for an annular flexible bag 22. Preferably the rim has a central circumferential channel 23 serving to reduce any tendency of the bag to roll from side to side. The bag is shaped to fit the rim, and when relatively deflated has an outer surface which is substantially flat although preferably having a slight dome. The outer major circumference of the bag when relatively deflated is sufficiently small to permit an endless band 24 of the tire building material being placed thereon without substantial stretching of the band material. This band, in the instance shown, is constructed of four plies of fabric (such as the rubberized cord fabric customarily used in the manufacture of cord tire casings) with the strain resisting cords running at an angle and, if cord fabric is used, the cords in the several plies extending oppositely to produce a balanced condition. This band may be built up out of separate strips 25, 26, 27, and 28, on a drum, a flipper board, the bag 22, or by any other suitable means, in substantially the same manner as two ply bands are built for the customary method of cord tire manufacture. It may be mentioned that ply 26 is preferably the widest, with plies 27 and 28 narrower, in order to have the various plies suitably positioned in the bead portion of the casing, as will appear from Fig. 11.

Figure 1:
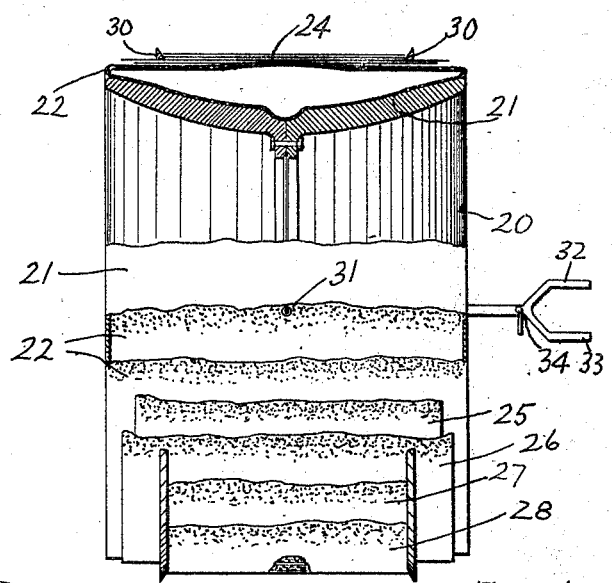
Fig. 1 is an elevation, partly progressively broken away and partly in section, of a device upon which the tire is constructed, showing also the first stage of constructing a tire thereon according to my invention.

After the band has been formed it is slipped axially over the bag 22, it being understood that the rim 20 is supported on a suitable rotatable support such for example as is customarily used for supporting the tire building formers in general use. The major circumference of the bag is preferably sufficiently smaller than the bag so that the lower portion of the band will be out of contact with the bag. This permits the band to be centralized upon the bag by moving only its top, the lower portion of the band, which hangs down below the bag, falling to its proper place naturally. With the band in position the bead fillers are applied. In Figs. 2 to 6 I have shown the use of an annular bead filler illustrated in enlarged section in Fig. 8. This filler has a pair of cables 29 in the base thereof, and a flexible portion 30 forming a substantially triangular body. The two annular fillers, which as will be understood serve to provide the tire casing with inextensible edges of proper form, are positioned around the band with their triangular sections pointing in opposite directions (Fig. 1), and abutting the edges of plies 27 and 28. The band is preferably formed sufficiently smaller than the inner circumference of the bead fillers so that these may hang from their upper portions in the same manner as the band itself hung upon the bag. By this construction, very little centering of the fillers is necessary, provided their upper portions are properly positioned with respect to the band.

Figure 2:
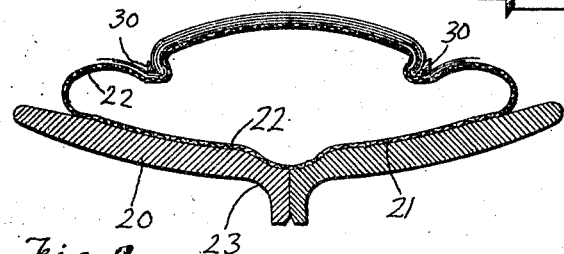

The bag is now inflated through a suitable aperture 31 (Fig. 1), which may be connected to a source of compressed air by a pipe 32 or to a vacuum by a pipe 33, a three way valve 34 being provided by which air under pressure may be admitted to or exhausted from the bag as desired by the operator. The air connections may be swiveled to the bag to permit the rim 20 to be rotated around its axis. Fig. 2 shows an intermediate stage of inflation and Fig. 3 a subsequent stage. It will be noted that on account of the width of the bag it will expand on both sides of the bead fillers. The expansion between the fillers serves to stretch the band out into the convex tire form which it is later to assume, and to shape the band around the bead fillers, while the expansion outside the bead fillers serves to turn the marginal portions of the band around the bead filler. As the band is composed of fabric coated with uncured rubber, the "lockup" or fold of the fabric around the bead fillers will be permanently secured by adhesion of the rubber as soon as the marginal portions are pressed against the body of the fabric (assisted by the customary wetting with naphtha if desired). This pressing of the marginal portions into locking position may be done manually from the position of Fig. 3, or the inflation of the tube may be carried somewhat further as indicated in dotted lines in Fig. 3 so that the inflation of the bag will itself fold the marginal portions completely around the fillers and press them against the body of the fabric. In either case the fold of the band about the fillers is made without distortion and adhesion is not secured until the band is stretched into substantially tire form, so that the cords in the body portion of the tire are held even to the toe of the bead filler in substantially the positions they tend to assume under inflation in the finished tire.

Figure 3:
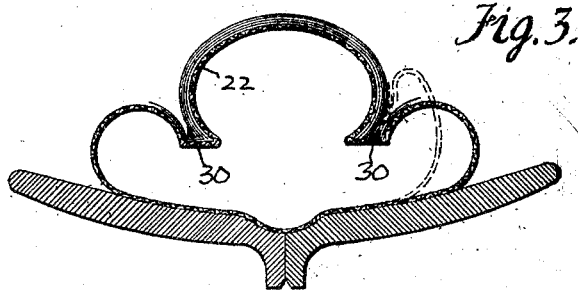
Figure 4:
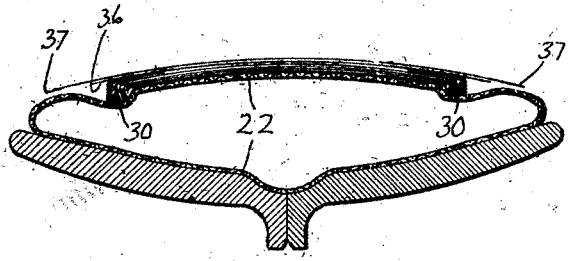

After the lockup is completed the bag is deflated, the uncured rubber with which the band is impregnated causing it to contract to substantially the form shown in Fig. 4. Uncured rubber will lose its tendency to return to its original form only if the distorting force acts for a considerable period of time, and the time during which the bag is kept under inflation as shown in Fig. 3 is short, so that only a very slight, practically negligible permanent set is given to the band by this preliminary expansion. With the band in substantially the form of Fig. 4 a second band, composed as shown of a narrow ply 36 and a wider ply 37, are placed in position and centered as in the case of the first band in encircling relation to the assembly previously built up. The bag is then given a second expansion until the carcass reaches a circumference substantially that which it is to assume in the completed casing. This point is preferably chosen for applying the tread, for reasons which will appear.

The tread rubber 38 (by which term I include such cushion rubber, breaker strips, and the like as may be desirable to apply) is shown in Fig. 5 as having been applied, and its marginal portions pressed against the carcass. This material can be applied when the carcass is deflated as in Fig. 4, or at any intermediate stage between Figs. 4 and 5, the expansion of the bag and carcass serving to press the tread firmly in place without the necessity for any stitching. As the tread material is composed almost entirely of uncured rubber, however, it will tend, if stretched, to return to the circumference from which the stretching started. If, for example, the tread is applied to the carcass in the position of Fig. 4 (it being understood that it will be so applied as to form an endless band adhering to the carcass throughout its circumference) the casing so built up will reassume its substantially flat shape upon release of the bag pressure unless that pressure has been sufficiently long continued to give a permanent set to the raw rubber. If the pressure is released as soon as the tread is applied the resulting flat casing will have to be expanded and set as a separate operation before the insertion of the air bag or other equipment upon which the casing is to be vulcanized. If the pressure is continued to give a permanent set the equipment will be unproductively employed for long periods, and much larger numbers of pieces of equipment must be used than economy would dictate. By deferring the placing of the tread materials until the carcass is inflated to substantially its dome circumference, the tendency of the casing to return to its flat form is practically removed. The tread material is in this case applied so as to form an endless band of substantially unstretched rubber firmly united to the rubber of the carcass as by rolling as in the usual manner of applying treads to carcasses built on ring cores. The relatively large bulk of the rubber in the tread offers a resistance to compression offsetting the tendency to contraction in the carcass rubber, so that when the bag 22 is deflated (Fig. 1) the casing will remain in an arched cross-sectional form only slightly less in circumference than when the tread was applied. This feature is claimed in a copending application.

The casing is now removed from the drum 20 and the outstanding edges of the ply 38 folded at 39 around the bead to complete the lockup. The sidewalls 40 and the chafing strips 41 may be added, and the casing thus completely built up ready for vulcanization. If desired, the sidewalls and chafing strips may be applied at the same time as the tread, the edges of the chafing strips being left free as with the edges of ply 37 and folded in after the casing is removed from the expanding bag, but the operator has a more horizontal surface to work to if the placing of the elements is deferred until the removal of the casing from the drum, and the latter method is therefore generally preferable.

The casing may be vulcanized in any desired manner, but I have shown in Fig. 7 in transverse section the casing positioned within the usual split molds 42 into which it is expanded by fluid under pressure admitted into an expansible annular bag 42' through a valve 43. The bag, which may be of the usual type, is sufficiently flexible so that it can be introduced into the casing when in the arched form shown in Fig. 6.

In the above description, I have described the bead filler as of the type illustrated in Fig. 8, with two cables in the base. A filler so constructed will always keep its base horizontal as viewed in the drawings. I also contemplate the use of a different type of filler, which I have illustrated in Figs. 9 and 10. This modified type has a single cable 44 in its base, and a body 45 of flexible material which is capable of yielding or rotating slightly with respect to the cable. This type of bead will shift so as to equalize the tension on the inner and outer plies both during vulcanization and in use under road conditions, and has other features of utility when used in connection with the above method of carcass building.

As preferably constructed, this modified form of bead filler has its inner surface tilted so as to be in effect a short frustrum of a cone, with the angle of tilt 46 in the neighborhood of ten degrees, more or less. The fillers are positioned on the carcass, then in the position of Fig. 1, as indicated in Fig. 9, with the inwardly projecting toe facing the center of the carcass. As the carcass is shaped from the position of Fig. 1 to those of Figs. 2 and 3 this modified or rotating form of bead will contract with the bulging sides of the carcass more quickly than the bead illustrated in Fig. 8, and will also arrive at the position of Fig. 3 with less sidewise pressure. During this motion the bead filler will rotate until its base is substantially on the surface of a cylinder rather than a cone, as indicated in Fig. 10.

Having thus described my invention, I claim:

1. A method of building a tire casing which comprises forming an endless band of carcass forming material, placing bead anchorages around the band adjacent its edges, supporting the band by a flexible cushioning pressure acting over the entire width between the anchorages, and expanding the central portion of the band while permitting the anchorages to float towards each other under the joint action of the expansion and the cushioning pressure.

2. A method of building a tire casing which comprises forming an endless band of carcass forming material, placing bead anchorages around the band adjacent its edges, expanding the central portion of the band towards tire form, and locking the marginal portions of the band around the anchorages only after the side portions of the band are extending in substantially the direction in which they lie in the completed tire.

3. A method of building a tire casing which comprises forming an endless band of carcass forming material, placing bead anchorages around the band adjacent its edges, expanding the central portion of the band towards tire form, and thereafter folding and locking the marginal portions of the band around the anchorages.

4. A method of building a tire casing comprising forming an endless band of a plurality of plies of carcass building material, restricting the band by bead anchorages, and expanding the band both between the anchorages to shape the band and outside the anchorages to turn the marginal portions of the band to permit the band to be locked at its edges around the anchorages.

5. A method of building a tire casing comprising forming an endless band of a plurality of plies of carcass building material, said band being substantially flat transversely and of approximately the bead circumference of the casing, restricting the band by anchorages placed adjacent each edge, and expanding the band both between the anchorages to shape the band and outside the anchorages to turn the marginal portions of the band around the anchorages.

6. A method of building a tire casing comprising forming an endless band of a plurality of plies of carcass building material, said band being substantially flat transversely and of approximately the bead circumference of the casing, restricting the band by anchorages placed adjacent each edge, and expanding the band both between the anchorages to shape the band and outside the anchorages to turn the marginal portions of the band around the anchorages, permitting the band to contract into substantially flat form, applying a second band of carcass forming material over the first band and anchorages, and expanding the assembly.

7. A method of building a tire casing which comprises constructing the carcass portion of less than its ultimate circumference, applying thereto bead reinforcements of substantially triangular cross-section with annular substantially inextensible anchorages adjacent one base corner thereof, said reinforcements being formed so that their bases are non-parallel with the base of the carcass, and being rotatable around said anchorages to bring their bases into parallelism with the base of the carcass, and expanding the carcass towards tire form.

8. An apparatus for expanding from the flat tire material having bead reinforcements located adjacent its edges, comprising fluid expansible means operable both between the bead reinforcements and outside the reinforcements.

9. An apparatus for expanding from the flat tire material having bead reinforcements located adjacent its edges, comprising means to expand the material between the reinforcements, and means to turn the marginal portions of the material around the anchorages.

10. An apparatus for expanding from the flat tire material having bead reinforcements located adjacent its edges, comprising fluid expansible means operable to expand the material between the bead reinforcements and to turn the marginal portions of the material around the reinforcements.

11. An apparatus for expanding from the flat tire material having bead reinforcements located adjacent its edges comprising a concave rim with an expansible bag located therein, the rim and bag being of greater width than the distance between the reinforcements.

MELVON A. MARQUETTE.